United States Patent
Irwin et al.

(10) Patent No.: US 7,655,271 B2
(45) Date of Patent: Feb. 2, 2010

(54) APPARATUS AND METHOD FOR MASKING

(75) Inventors: Patricia Chapman Irwin, Altamont, NY (US); Peter John Foley, Scotia, NY (US); Elena Rozier, Schenectady, NY (US); Tamara Jean Kluge, Burnt Hills, NY (US); John Kost, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 526 days.

(21) Appl. No.: 11/422,987

(22) Filed: Jun. 8, 2006

(65) Prior Publication Data

US 2007/0286988 A1 Dec. 13, 2007

(51) Int. Cl.
 *B05D 1/04* (2006.01)
(52) U.S. Cl. .................. 427/116; 427/117; 427/468; 427/475
(58) Field of Classification Search ................ 427/116, 427/117, 468, 475
 See application file for complete search history.

(56) References Cited

U.S. PATENT DOCUMENTS

| 5,260,097 | A | * | 11/1993 | Silvestre ............... 427/282 |
| 5,691,018 | A | | 11/1997 | Kelley et al. |
| 5,885,395 | A | * | 3/1999 | Western ................ 156/247 |
| 2004/0028822 | A1 | * | 2/2004 | Dutt et al. ............. 427/385.5 |
| 2004/0056039 | A1 | | 3/2004 | Sarajian |

FOREIGN PATENT DOCUMENTS

| DE | 2611631 A1 | 10/1977 |
| DE | 19619254 C1 | 10/1997 |
| EP | 0262946 A2 | 4/1988 |

OTHER PUBLICATIONS

ASTM International Designation: D 2240-05; "Standard Test Method for Rubber Property—Durometer Hardness"; 13 pages.
ASTM International designation: C-603-04; Standard test Method for Extrusion Rate and Aplication Life of Elastomeric Sealants; 2 pages.
DE19619254; Publication Date: Oct. 2, 1997; Abstract Only; 1 page.
EP Search Report; EP Application No. 07109258.9-2425; Reference: 196972/12346; Date of Mailing: 2007-0904; 3 pages.

* cited by examiner

*Primary Examiner*—Frederick J Parker
(74) *Attorney, Agent, or Firm*—Cantor Colburn LLP

(57) ABSTRACT

In one embodiment a coating process is disclosed. The process comprises, assembling a coating shield to an article, and disposing a coating on the article via an electrostatic coating process, wherein the coating lacks electrostatic attraction to the coating shield.

19 Claims, 7 Drawing Sheets

APPARATUS AND METHOD FOR MASKING

BACKGROUND

Masking films (e.g., tapes or foils) and/or masking sheets (e.g., formed sheet metal) can be employed to mask portions of an article during the application of coatings (e.g., powder coatings, polymer coatings, and so forth). Also referred to as "masks" or "maskings", masking films and/or sheets are assembled onto the article prior to the coating process and temporarily secured thereto via adhesives and/or securement features (e.g., tabs, clips, screws, and the like). After the coating has cured, the mask is then removed leaving an uncoated area, which is desirably delineated from the coating area by a fine line.

Although masking films and sheets have exhibited success in many cases, in applications wherein an article comprises relatively complex geometries and/or surfaces, the masking process can be detrimentally time consuming and labor intensive. To be more specific, when masking articles comprising complex geometries and/or surfaces are masked, the application of the masking is applied by hand by a laborer who must take care in following the complex features and contours around the area to be masked. Such complex geometries and/or surfaces can comprise, undercuts, internal features, uneven surfaces (e.g., generator windings), textured surfaces (e.g., grit blasted surfaces), figured surfaces (e.g., ornamental surfaces), and so forth. In such labor intensive and time consuming masking processes, the resulting manufacturing cost can decrease overall profits. In addition, in electrostatic coating processes, the coating can be attracted to the masking as well as the article being coated. Not only does this further reduce profits by increasing costs associated with coating raw materials, but also, when the mask is removed, the interface between the mask and the article can unevenly crack, chip, and/or delaminate, which forms an unpleasing rough edge, that is perceived as poor quality. Further, masks that employ adhesives can leave adhesive residues on the article that can be undesirable.

To remediate these shortcomings, what is needed in the art is reusable masks that do not attract electrostatic coatings, which can be efficiently assembled and disassembled on complex geometries without utilizing adhesives.

BRIEF SUMMARY

Disclosed herein are masking articles and methods for their use.

In one embodiment, a coating process comprises assembling a non-electrically conductive coating shield to an article and electrostatically coating the article. The coating lacks electrostatic attraction to the coating shield.

In another embodiment, the coating process, comprises: assembling a non-electrically conductive coating shield onto a protrusion extending from an article, electrostatically coating the article and removing the coating shield from the coated article. During the electrostatically coating the article, the coating lacks electrostatic attraction to the coating shield.

In one embodiment, a generator component comprises: a body, a channel disposed into the body, a non-electrically conductive coating shield disposed within the channel, and a coating on the body. The channel and an interface between the coating shield and the body are coating-free.

The above described and other features are exemplified by the following figures and detailed description.

BRIEF DESCRIPTION OF THE DRAWINGS

Refer now to the figures, which are exemplary embodiments and wherein the like elements are numbered alike.

DETAILED DESCRIPTION

Figure 1:
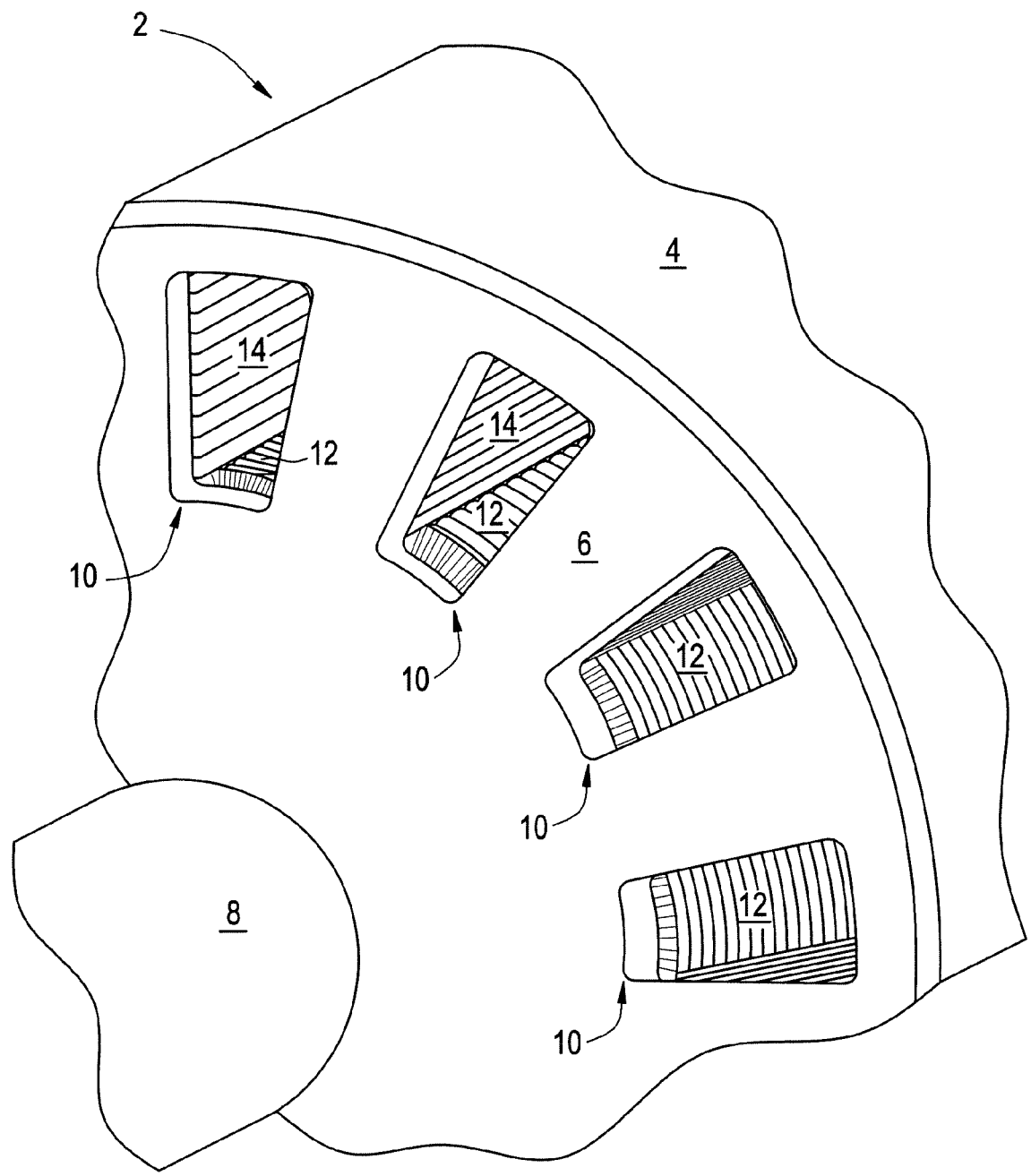
FIG. 1 is an oblique and partial view of an exemplary air-cooled generator.

Disclosed herein are elastomeric coating shields that can be employed to mask portions of complex geometries during coating processes, such as electrostatic coating processes. To be more specific, elastomeric coating shields comprise malleable polymeric materials that are capable of conforming to complex geometries. In addition, these elastomeric polymers are non-conductive and do not attract electrostatic coatings.

The benefits of the coating shields disclosed herein will be apparent to those skilled in the art as they provide for the masking of complex surfaces and/or geometries with greater ease than conventional film and/or sheet masking materials. In addition, as the polymers are non-electrically conductive, so electrostatically applied coatings do not adhere to the coating shield, which results in a decrease in the amount of coating employed as well as prevents the coating from spanning the interface between the article being coated and the coating shield; the coating shield lacks electrostatic attraction to the electrostatic coating. This is advantageous as it has been determined that when the coating spans the interface, the coating chips, cracks, and/or delaminates as the coating shield is removed. In addition, as will be disclosed, the materials employed for the coating shield can provide a variety of properties and therefore can be adapted for many masking applications. Furthermore, the coating shields disclosed are reusable and provide for improved manufacturing efficiencies. All of which, result in greater manufacturing profits.

At the outset, unless defined otherwise, technical and scientific terms used herein have the same meaning as is commonly understood by one of skill in the art to which this invention belongs. The terms "first", "second", and "the like", as used herein do not denote any order, quantity, or importance, but rather are used to distinguish one element from another. Also, the terms "a" and "an" do not denote a limitation of quantity, but rather denote the presence of at least one of the referenced item, and the terms "front", "back", "bottom", and/or "top", unless otherwise noted, are merely used for convenience of description, and are not limited to any one position or spatial orientation. If ranges are disclosed, the endpoints of all ranges directed to the same component or property are inclusive and independently combinable (e.g., ranges of "up to about 25 wt. %, or, more specifically, about 5 wt. % to about 20 wt. %," is inclusive of the endpoints and all intermediate values of the ranges of "about 5 wt. % to about 25 wt. %," etc.). The modifier "about" used in connection with a quantity is inclusive of the stated value and has the meaning dictated by the context (e.g., includes the degree of error associated with measurement of the particular quantity). The suffix "(s)" as used herein is intended to include both the singular and the plural of the term that it modifies, thereby including one or more of that term (e.g., the colorant(s) includes one or more colorants). Furthermore, as used herein, "combination" is inclusive of blends, mixtures, alloys, reaction products, and the like.

Several designs of coating shields, and methods of their use, are disclosed herein with references to individual figures. One of skill in the art will easily recognize that many of the components of each of the embodiments are similar to or identical to each other. These various components can be added or omitted based on various design choices. As such, various elements and/or features can be introduced in a given figure with the understanding that coating shields can be modified as taught herein to include features illustrated in other embodiments. Each of these elements is first introduced in the discussion of a given figure but is not repeated for each embodiment. Rather, distinct structure is discussed relative to each figure.

Referring now to FIG. 1, a generator 2 comprises a body cylinder 4 connected to an end-plate 6. Cooling channels 10 are disposed about an end-plate 6, through which air can flow. A shaft 8 extends through the end-plate 6 and is connected to a rotor 12, which rotates freely within windings 14 disposed about the cylinder 4, wherein the windings 14 can be cooled during operation via cooling channels 10.

To protect the cylinder 4, end-plate 6, and cooling channels 10 from corrosion during use, a coating (e.g., a powder coating) can be applied to the external surfaces of these components using an electrostatic process. In this embodiment, it is advantageous to coat the cylinder 4, end-plate 6, and cooling channels 10 after the air-cooled generator 2 (hereinafter also referred to as "generator") has been assembled as it requires less coating operations and minimizes coating damage during assembly (e.g., chipping). However, during the electrostatic coating process if the cooling channels 10 are not occluded, the coating is also attracted to the rotor 12 and windings 14, which will decrease heat transfer and overall cooling efficiency. Moreover, it has been found to be challenging to mask the rotor 12 and/or windings 14 after the generator 2 has been assembled because the surfaces to be masked are disposed within the generator 2 and the windings 14 and rotor 12 and comprise complex surfaces (e.g., bumpy). Therefore, to mask the windings 14 and rotor 12, an elastomeric coating shield 16 can be employed.

Figure 2:
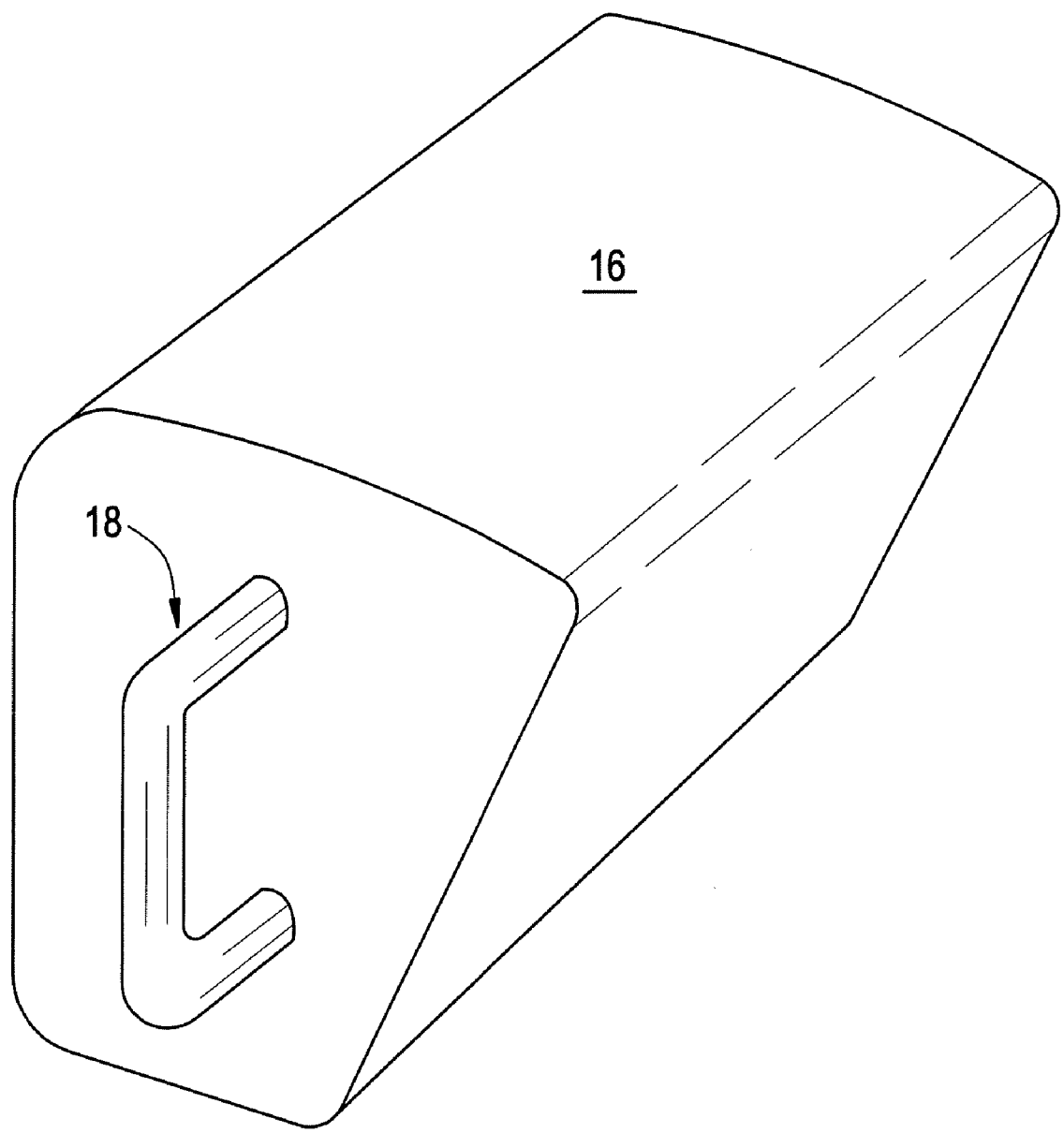
FIG. 2 is an oblique and partial view of an exemplary coating shield.

Referring now to FIG. 2, a coating shield 16 is configured with a geometry that is generally similar to the area defined by adjacent windings 14, the internal surface of the cylinder 4, and the rotor 12 in FIG. 1. The coating shield 16 is malleable and can be conformed to the complex (e.g., bumpy) surfaces of the rotor 12 and windings 14. The coating shield 16 also comprises an optional insertion handle 18, which allows the coating shield 16 to be easily inserted into and removed from the cooling channel 10, as illustrated in FIG. 3.

Figure 3:
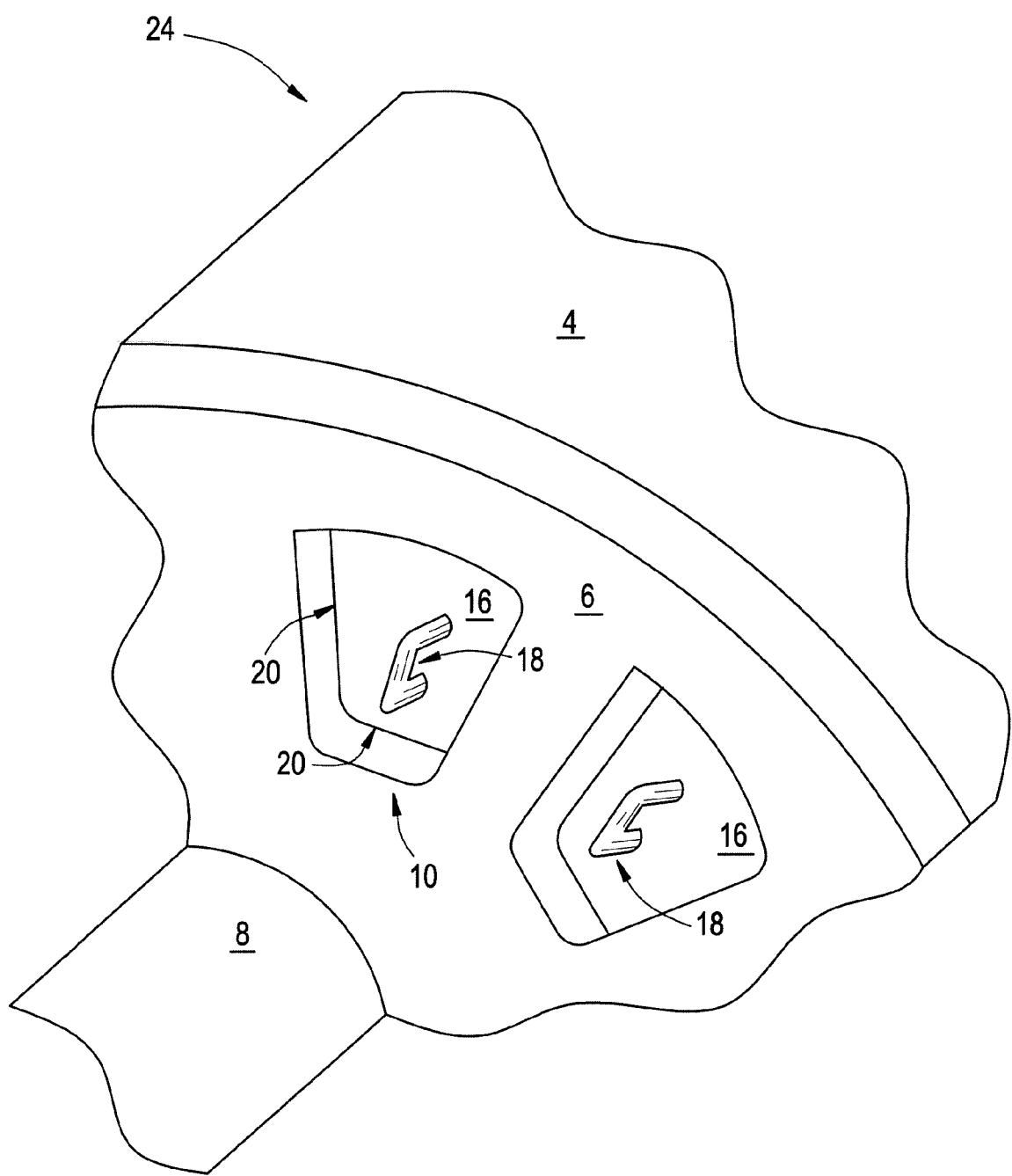
FIG. 3 is an oblique and partial view of an exemplary masked assembly.

Referring now to FIG. 3, a masked assembly 24 comprises a coating shield 16 that has been assembled into the generator 2 by inserting the coating shield 16 through the cooling channel 10. The coating shield 16 is disposed in contact with the windings 14, rotor 12, internal surface of the cylinder 4 (not shown), and the internal surface of the end-plate 6 (not shown), wherein the contact provides ample friction to retain the coating shield 16 in place during a coating process. The coating shield 16 is configured such that it can prevent at least a portion of the coating from passing through the interface 20 of the coating shield 16 and the cooling channel 10, while allowing the coating to contact the cooling channel 10. However, it is more desirable that the coating shield 16 can prevent a majority, or even more specifically, all of the coating from passing through the interface 20.

The coating shield 16 is non-electrically conductive and, therefore, does not attract electrostatically charged coatings. This prevents the coating from accumulating on the coating shield 16, and advantageously prevents the coating from bridging (e.g., spanning) across the interface 20 between the cooling channel 10 and the coating shield 16. When bridging does occur across the interface 20, the resulting coating is susceptible to cracking, chipping, and/or delaminating during removal of the coating shield 16 once the coating has been cured. It is to be understood by those skilled in the art that the cracking, chipping, and/or delamination referred to herein are at a macroscopic level, hence, viewable by an unaided eye (i.e., without magnification) at a distance of about 24 inches.

The coating shield 16 can be employed in any application wherein a portion of an article is to be masked from a coating (e.g., an electrostatically charged coating). The coating shield 16 can comprise any geometry, wherein the polymers employed exhibit ample strength and durability to provide for at least one coating process; although, reusability is desired.

Figure 4:
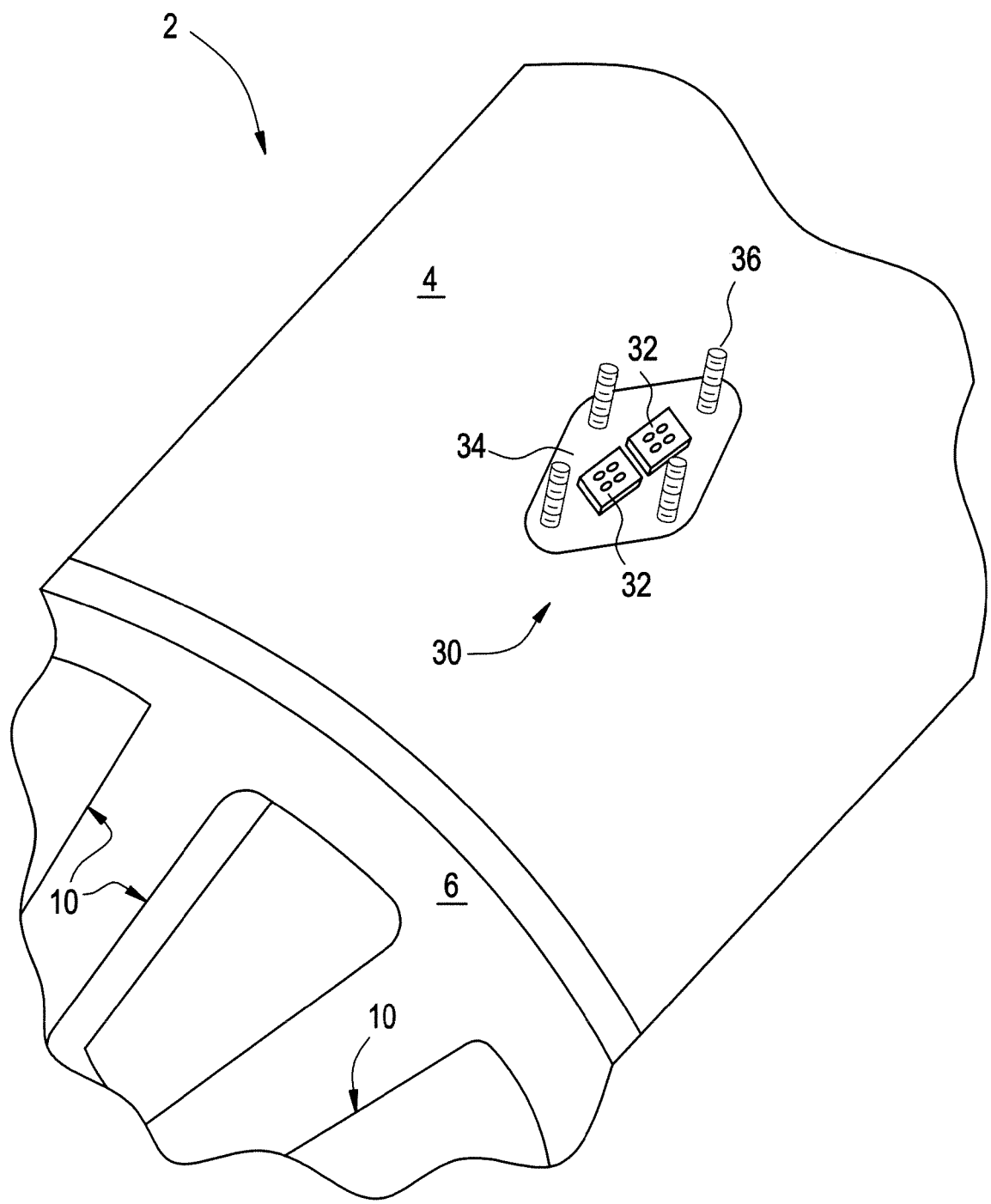
FIG. 4 is an oblique and partial view of an exemplary connection.

In another embodiment, referring now to FIG. 4, an exemplary connection 30 is disposed on the outside surface of the generator's (2) cylinder 4. The connection 30 comprises two connectors 32 that can provide process monitoring of the generator 2. The connectors 32 are masked prior to coating. The generator component that will be assembled to the connection 30 (not shown) comprises a diamond-shaped footprint 34 that is also to be masked prior to coating. Four bolts 36 are employed to connect the apparatus to the connection 30 after the coating process, wherein the bolts 36 are also to be masked.

Figure 5:
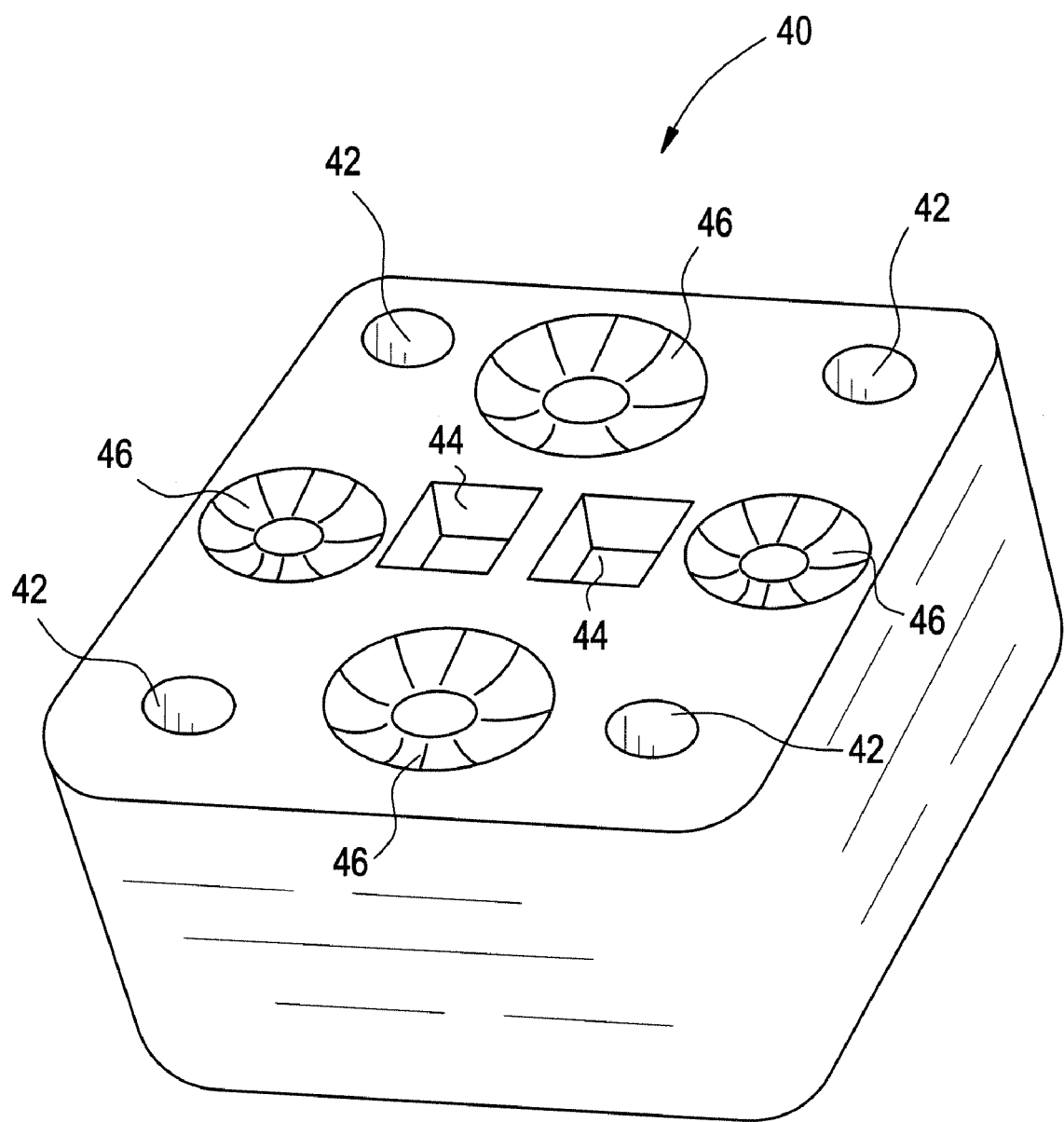
FIG. 5 is an oblique and partial view of an exemplary coating shield.
Figure 6:
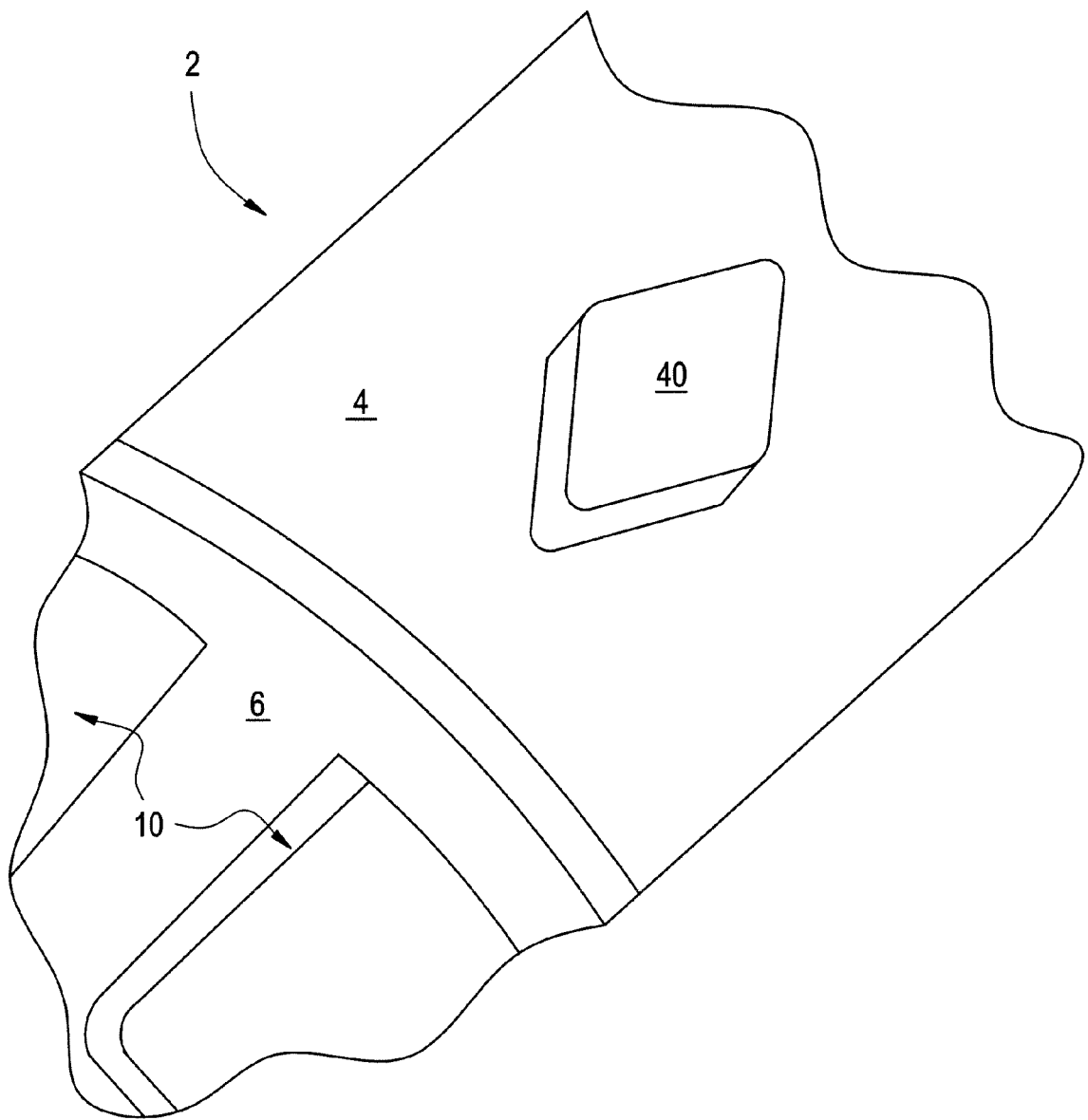
FIG. 6 is an oblique and partial view of an exemplary masked assembly

Referring now to FIG. 5, a coating shield 40 comprising a diamond shape resembling the footprint 34 can be assembled to the connection 30. The coating shield 40 further comprises four bolt pockets 42 and two connector pockets 44, which are configured to assemble around the bolts 36 and connectors 32 (i.e., protrusions). The coating shield 40 also comprises optional suction pockets 46 that can be employed to create a vacuum against the cylinder 4 of the generator 2 once assembled thereto. The suction pockets 46 can comprise any shape, number, and/or configuration that can be used in a manner similar to a "suction cup" to hold the coating shield 40 against the cylinder 4. An oblique and partial view of the exemplary masked assembly 48 is illustrated in FIG. 6.

Figure 7:
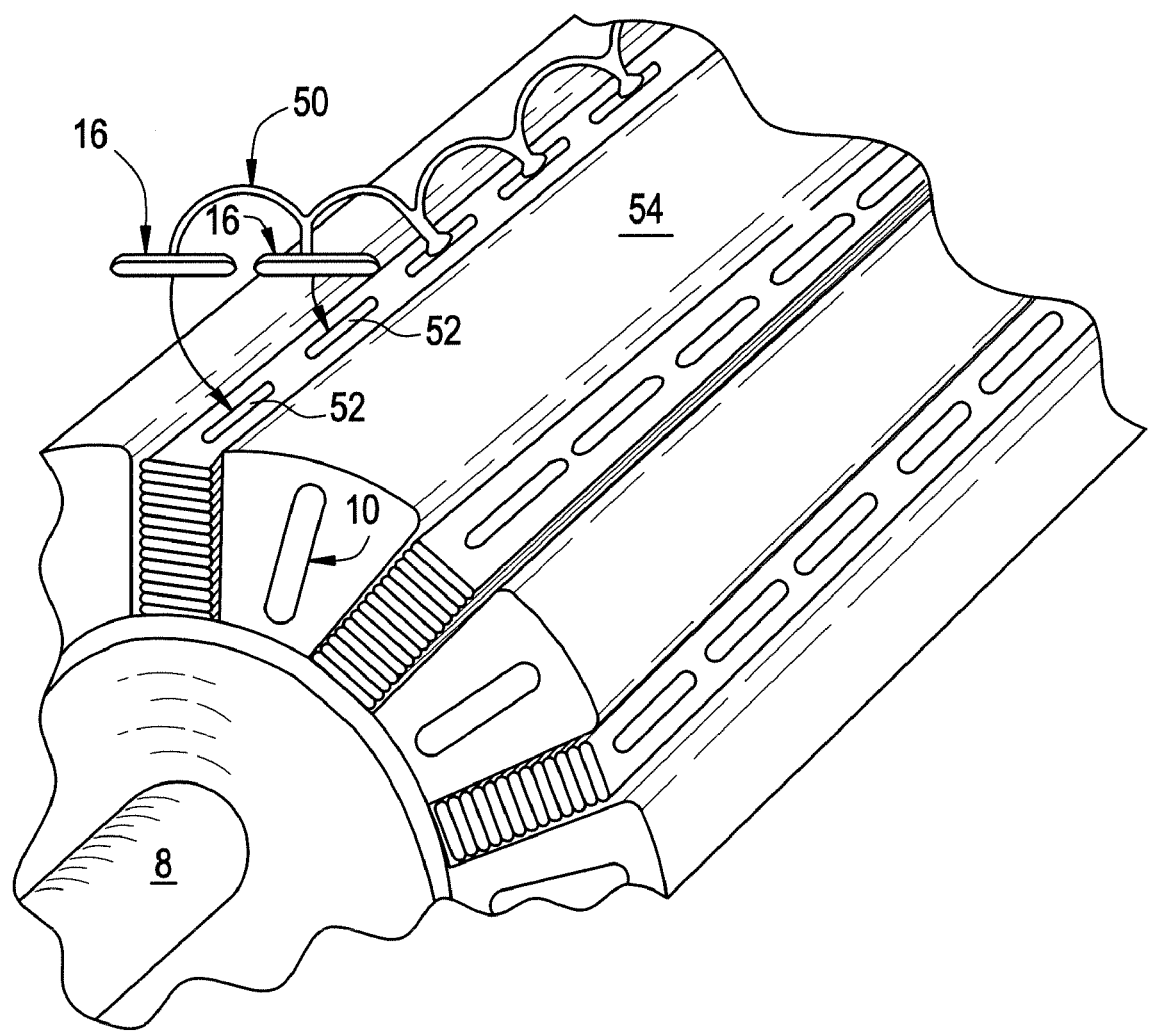
FIG. 7 is an oblique and partial view of a plurality of coating shields 16 being assembled within vents 52 in a modified generator 54

Referring now to FIG. 7, an oblique and partial view of a plurality of coating shields 16 being assembled within vents 52 in a modified generator 54 is illustrated, as indicated by the directional arrows. A connector 50 joins the coating shields 16 to one another. The connector 50 can be employed to assist in the removal of the coating shields 16 (e.g., the connector 50 can be used to pull out a series of coating shields 16) and helps assure a coating shield 16 is not inadvertently left within a vent 52 (or cooling channel 10) after the coating process. The connector 50 can be integrally formed with the coating shields 16, or can be any article connected thereto (e.g., such as a string, strap, and so forth). The specific material employed for the connector 50 can comprise any material that does not electrostatically attract a coating during electrostatic coating processes, such as a polymeric material. In addition, to ensure the connector 50, and coating shields 16 attached thereto, are removed from the modified generator 54, the connector 50 and/or coating shields 16 can comprise a distinct or noticeable color if desired.

The coating shields (e.g., coating shield 16 and coating shield 40) can be fabricated from an elastomeric polymer that is capable of conforming to a channel when inserted therein or conforming over a protrusion that extends from an article that is to be coated. The elastomeric polymers can have a durometer equal to or less than about 85A, or even more specifically, less than or equal to about 65A, or even more specifically, less than or equal to about 45A, Shore A hardness as measured by ASTM 2240-05. Suitable polymers comprise: thermoplastic polymers, thermosetting polymers, and polymeric foams, as well as combinations comprising at least one of the foregoing. Exemplary thermoplastics are: polyurethanes, polyvinylchlorides, polybutadienes, polyesters, polyethers, polyisoprenes, polychloroprenes, and so forth, as well as combinations comprising at least one of the foregoing. Exemplary thermosetting polymers can comprise: polyurethanes, natural rubber, synthetic rubber, organopolysiloxanes and the like.

The specific polymer will be selected to provide malleability and elasticity, so that the coating shield can conform and mask various complex geometries and surfaces. In addition to malleability and elasticity, the polymer selected will comprise resiliency so that the coating shield can be assembled and disassembled from the masked article without incurring damage which renders the coating shield inoperable, such as breakage, cracking, and/or tearing, and optimally, would allow the coating shield to be used more than once. In thermally cured coating applications, such as those that employ thermosetting polymers, the polymer employed for the coating shield will be capable of withstanding the curing operations, such as extended periods of time (e.g., about eight hours or more) at elevated temperatures (e.g., about 400° F. (204° C.) or more). One specific material that exhibits suitable properties is silicone.

Silicones are formed from curable, two-part compositions that exhibit flexibility and good compression set. Silicones can comprise compositions suited for various processing methods, such as curable liquid silicone rubber (hereinafter LSR) compositions and liquid injection moldable (hereinafter LIM) compositions, which can comprise curable silicone gels and/or silicone fluids. Curable silicone gels and/or silicone fluids provide castability to the curable composition as well as desirable physical properties, such as softness. The amount of gel relative to Liquid Silicone Rubber (LSR) or Liquid Injection Molding (LIM) operations can be adjusted accordingly to allow tailoring of the viscosity of composition, and, thus, softness and other properties in the cured silicone.

LSR or LIM systems are generally provided as two-part formulations suitable for mixing in ratios of about 1:1 by weight or volume. One part typically contains one or more organopolysiloxanes having at least two alkenyl groups, catalyst(s), and any optional fillers and/or additives (other than conductive fillers). The second part typically contains one or more organopolysiloxanes having at least two alkenyl groups, one or more organopolysiloxanes having at least two silicon-bonded hydrogen atoms per molecule, and any optional fillers and/or additives (other than conductive fillers). Silicone compositions that do not employ a curable silicone gel and/or a silicone fluid, can comprise first and second parts having a viscosity of less than about 100,000 centipoise (cps), or more specifically, less than about 50,000 cps, and even more specifically, less than about 35,000 cps. Such compositions can exhibit a neat extrusion rate of less than about 500 g/minute measured according to ASTM C-603-04.

Suitable organopolysiloxanes having at least two alkenyl groups per molecule are generally represented by the formula:

$$M_a D_b T_c Q_d,$$

wherein subscripts a, b, c, and d are zero or a positive integer subject to the limitation, that if subscripts a and b are both equal to zero, subscript c is greater than or equal to two; M has the formula $R_3SiO_{1/2}$; D has the formula $R_2SiO_{2/2}$; T has the formula $RSiO_{3/2}$; and Q has the formula $SiO_{4/2}$, wherein each R group independently represents hydrogen, alkenyl groups, or substituted and unsubstituted monovalent hydrocarbon groups having about 1 to about 40, or, more specifically, about 1 to about 6 carbon atoms each, subject to the limitation that at least two of the R groups are alkenyl R groups. Suitable alkenyl R groups are exemplified by vinyl, allyl, butenyl, pentenyl, hexenyl, and/or heptenyl. The alkenyl group can be bonded at molecular chain terminals, in pendant positions on the molecular chain, or both.

Other silicon-bonded organic groups in the organopolysiloxane having at least two alkenyl groups, when present, are exemplified by substituted and unsubstituted monovalent hydrocarbon groups having about 1 to about 40 carbon atoms. For example, alkyl groups such as methyl, ethyl, propyl, butyl, pentyl, and hexyl; aryl groups such as phenyl, tolyl, and xylyl; aralkyl groups such as benzyl and phenethyl; and halogenated alkyl groups such as 3-chloropropyl and 3,3,3-trifluoropropyl, can be employed.

The alkenyl-containing organopolysiloxane can have straight chain, partially branched chain, branched-chain, network molecular structure, as well as combinations comprising at least one of the foregoing structures. Alkenyl-containing organopolysiloxane is exemplified by trimethylsiloxy-endblocked dimethylsiloxane-methylvinylsiloxane copolymers; trimethylsiloxy-endblocked methylvinylsiloxane-methylphenylsiloxane copolymers; trimethylsiloxy-endblocked dimethylsiloxane-methylvinylsiloxane-methylphenylsiloxane copolymers; dimethylvinylsiloxy-endblocked dimethylpolysiloxanes; dimethylvinylsiloxy-endblocked methylvinylpolysiloxanes; dimethylvinylsiloxy-endblocked methylvinylphenylsiloxanes; dimethylvinylsiloxy-endblocked dimethylvinylsiloxane-methylvinylsiloxane copolymers; dimethylvinylsiloxy-endblocked dimethylsiloxane-methylphenylsiloxane copolymers; dimethylvinylsiloxy-endblocked dimethylsiloxane-diphenylsiloxane copolymers; as well as combinations comprising at least one of the foregoing organopolysiloxanes.

A suitable organopolysiloxane having at least two silicon-bonded hydrogen atoms per molecule is generally represented by the formula:

$$M'_a D'_b T'_c Q'_d,$$

wherein subscripts a, b, c, and d are zero or a positive integer, subject to the limitation that if subscripts a and b are both equal to zero, subscript c is greater than or equal to two; M' has the formula $R_3SiO_{1/2}$; D' has the formula $R_2SiO_{2/2}$; T' has the formula $RSiO_{3/2}$; and Q' has the formula $SiO_{4/2}$, wherein each R group independently represents hydrogen or substituted and unsubstituted monovalent hydrocarbon groups having about 1 to about 40, or more specifically, about 1 to about 6 carbon atoms each, subject to the limitation that at least two of R groups are hydrogen. Yet further, each of the R groups of the organopolysiloxane having at least two silicon-bonded hydrogen atoms per molecule are independently selected from hydrogen, methyl, ethyl, propyl, butyl, pentyl, hexyl, aryl, phenyl, tolyl, xylyl, aralkyl, benzyl, phenethyl, halogenated alkyl, 3-chloropropyl, 3,3,3-trifluoropropyl, as well as combinations comprising at least one of the foregoing.

The hydrogen can be bonded at molecular chain terminals, in pendant positions on the molecular chain, as well as combinations comprising at least one of the foregoing. The hydrogen-containing organopolysiloxane component can have a straight chain, partially branched chain, branched-chain, cyclic, or network molecular structure, as well as combinations comprising at least one of the foregoing.

The hydrogen-containing organopolysiloxane is exemplified by trimethylsiloxy-endblocked methylhydrogenpolysiloxanes; trimethylsiloxy-endblocked dimethylsiloxane-methylhydrogensiloxane copolymers; trimethylsiloxy-endblocked methylhydrogensiloxane-methylphenylsiloxane copolymers; trimethylsiloxy-endblocked dimethylsiloxane-methylhydrogensiloxane-methylphenylsiloxane copolymers; dimethylhydrogensiloxy-endblocked dimethylpolysiloxanes; dimethylhydrogensiloxy-endblocked methylhydrogenpolysiloxanes; dimethylhydrogensiloxy-endblocked dimethylsiloxanes-methylhydrogensiloxane copolymers; dimethylhydrogensiloxy-endblocked dimethylsiloxane-methylphenylsiloxane copolymers; and dimethylhydrogensiloxy-endblocked methylphenylpolysiloxanes, as well as combinations comprising at least one of the foregoing.

The hydrogen-containing organopolysiloxane component is used in an amount sufficient to cure the composition, or more specifically, in a quantity that provides about 1.0 to about 10 silicon-bonded hydrogen atoms per alkenyl group in alkenyl-containing organopolysiloxane. When the number of silicon-bonded hydrogen atoms per alkenyl group exceeds about ten, foam may be produced during cure and the heat resistance of the resulting cured silicone can progressively decline.

The curable composition further comprises, generally as a component of the part containing organopolysiloxane having at least two alkenyl groups per molecule, a hydrosilylation-reaction catalyst. Catalysts that promote the addition of silicon-bonded hydrogen onto alkenyl multiple bonds, can be employed to accelerate the cure. Such catalysts can include a noble metal(s), such as, platinum, rhodium, palladium, ruthenium, iridium, as well as a combination comprising at least one of the foregoing. The catalyst can also include a support material, such as activated carbon, aluminum oxide, silicon dioxide, thermoplastic resin, and so forth, as well as combinations comprising at least one of the foregoing. For example, platinum and compounds comprising platinum can be used as hydrosilylation-reaction catalysts, such as, platinum black, platinum-on-alumina powder, platinum-on-silica powder, platinum-on-carbon powder, chloroplatinic acid, alcohol solutions of chloroplatinic acid platinum-olefin complexes, platinum-alkenylsiloxane complexes and catalysts afforded by microparticulation or dispersion of a platinum addition-reaction catalyst in a thermoplastic resin such as methyl methacrylate, polycarbonate, polystyrene, silicone, and the like, as well as combinations comprising at least one of the foregoing.

A quantity of catalyst sufficient to cure the composition is used, generally about 0.1 to about 1,000 parts per million by weight (ppm) of metal (e.g., platinum) based on combined amounts of reactive organopolysiloxane components. However, it is to be apparent that the specific catalyst(s) can be tailored to modify the cure.

Optionally, other additives can be present in either of the curable polyorganosiloxane compositions, for example, non-conductive reinforcing fillers, ultraviolet (UV) stabilizers, antioxidants, lubricants, plasticizers, blowing agents and/or pigments and dyes. For example, a non-conductive reinforcing filler (e.g., fumed silica, glass fibers, silicates, $TiO_2$, graphite, calcium carbonate, mica, talc, and the like) can be present in one or both parts, in amounts of about 10 to about 30% by weight of each part.

The curable composition can further comprise a curable silicone gel formulation and/or a silicone fluid. The silicone gel or fluid becomes part of the polymer matrix, leading to low out-gassing and little or no migration to the surface during use. The boiling point of silicone fluid (when used) is high enough such that when it is dispersed in a polymer matrix, it does not evaporate during or after cure, and does not migrate to the surface or outgas.

Silicone gels are lightly cross-linked fluids or under-cured elastomers. They are unique in that they range from very soft and tacky to moderately soft and only slightly sticky to touch. Use of a gel formulation decreases the viscosity of the composition significantly, thereby resulting in cured compositions having increased softness. Suitable gel formulations may be either two-part curable formulations or one-part formulations. The components of the two-part curable gel formulations are similar to that described above for LSR systems (i.e., an organopolysiloxane having at least two alkenyl groups per molecule and an organopolysiloxane having at least two silicon-bonded hydrogen atoms per molecule), however do not comprise a filler, and have a molar ratio of silicon bonded hydrogen groups (Si—H) to alkenyl groups that is usually less than one, and can be varied to create an "under-cross linked" polymer with the softness of a cured gel. To be more specific, the ratio of silicone-bonded hydrogen atoms to alkenyl groups is less than about 1.0, or more specifically, less than about 0.75, or even more specifically, less than about 0.6, or even less than about 0.1. An example of a commercially available two-part silicone gel formulation is SYLGARD® 527 gel (Dow Corning Corporation).

Organopolysiloxane fluids have a viscosity of less than about 1000 cps, or more specifically, less than about 750 cps, or even more specifically, less than about 600 cps, and most specifically, less than about 500 cps. The organopolysiloxane fluid component is added to decrease the viscosity of the composition and should not inhibit the curing reaction, i.e., addition reaction, of the composition.

The organopolysiloxane fluid is generally represented by the formula:

$$M''_a D''_b T''_c Q''_d,$$

wherein subscripts a, b, c, and d are zero or a positive integer, subject to the limitation that the sum of subscripts a, b, and c is one or greater; M" has the formula $R_3SiO_{1/2}$; D" has the formula $R_2SiO_{2/2}$; T" has the formula $RSiO_{3/2}$; and Q" has the formula $SiO_{4/2}$, wherein each R group independently represents hydrogen, or a substituted and/or unsubstituted hydrocarbon group having about 1 to about 40, or more specifically, about 1 to about 6 carbon atoms each. Moreover, each R group is independently selected from the group consisting of hydrogen, methyl, ethyl, propyl, butyl, pentyl, hexyl, aryl, phenyl, tolyl, xylyl, aralkyl, benzyl, phenethyl, halogenated alkyl, 3-chloropropyl, 3,3,3-trifluoropropyl, vinyl, allyl, butenyl, pentenyl, hexenyl, heptenyl, as well as combinations comprising at least one of the foregoing.

Reactive organopolysiloxane fluids co-cure with the alkenyl-containing organopolysiloxane and organopolysiloxane having at least two silicon-bonded hydrogen atoms, and therefore can contain alkenyl groups or silicon-bonded hydrogen groups. Such compounds may have the same structures as described above in connection with alkenyl-containing organopolysiloxane and organopolysiloxane having at least two silicon-bonded hydrogen atoms but, in addition, have a viscosity of less than about 1000 cps and have a boiling point greater than the curing temperature of addition cure reaction, i.e., greater than or equal to about 260° C. (500° F.).

The specific composition of the LSR, LIM, gel, and/or fluid formulations will depend on a number of factors, including, viscosity, extrusion rate, fillers, the amount of filler present, the desired physical properties of the cured silicone, and similar considerations. For example, a silicone gel formulation can comprise less than or equal to about 80, or more specifically, less than or equal to about 65 weight percent (wt. %) of the polysiloxane (plus a catalyst and any optional catalysts and/or fillers) mixture, and greater than or equal to about 5, or more specifically, greater than or equal to about 10, or even more specifically, greater than or equal to about 30 wt. % of total polysiloxane (plus a catalyst and any optional catalysts and/or fillers) mixture. The amount of organopolysiloxane fluid is about 5 to about 50 wt. % of the total polysiloxane (plus a catalyst and any optional catalysts and/or fillers) mixture. Within this range, the organopolysiloxane fluid is present in an amount greater than or equal to about 5, or more specifically greater than or equal to about 7.5, or even more specifically greater than or equal to about 10 wt. % of total polysiloxane mixture. Also within this range, the organopolysiloxane fluid concentration is less than or equal to about 50, or more specifically, less than or equal to about 25, or even more specifically less than or equal to about 20 wt. %.

The filler(s) and/or additive(s) are added in quantities that are effective to achieve the desired properties. Particular quantities will vary depending on type and shape of filler, silicone formulation, and/or similar considerations. Generally, about 10 to about 90 wt. % of filler/additives is effective, based on the total weight of the curable composition, the remainder being the organopolysiloxane mixture described above. Within this range, the filler/additives concentration is greater than or equal to about 20 wt. % of the total weight of curable composition. Also within this range, the filler/additives concentration is less than or equal to about 85 wt. % of the total weight of the curable composition. When the addition of filler(s) exceeds the upper limit of the range, the composition exhibits progressively higher hardness, higher viscosity, and decreases in processability. Smaller quantities of fillers/additives may be also effective, i.e., about 0.1 to about 20 wt. %, or more specifically, about 1 to about 10 wt. %.

Molecular sieves can be mixed into the formulation to remove water. Use of molecular sieve appears to help reduce poisoning of catalyst. Typical amounts of sieve are up to about 5 wt. %, based on the total weight of the curable composition. The sieve concentration is greater than or equal to about 1 wt. %, or more specifically, greater than or equal to about 1.5 wt. %. Also within this range, the sieve concentration is less than or equal to about 3 wt. %, or more specifically, less than or equal to about 2.5 wt. %. An example of a suitable sieve is 3A sieves from UOP Corporation.

The cured silicones can also be formulated to have a compression set resistance of less than about 30%, or more specifically, less than about 25%, or even more specifically, less than about 15% as measured at 100° C. under 25% compression for 70 hours.

In one method of manufacturing a silicone coating shield, a handle 18 is inserted into a mold that is fixed within a liquid injection molding machine. The mold is closed as a two-part platinum cured polymer comprising a durometer of about 65A (Rockwell A-scale) is metered into a barrel comprising a screw. The screw rotates within the barrel to mix the two-part polymer. Once mixed, a shut-off nozzle fixated at an end of the barrel and in contact with a runner system connected to the cavity within the mold opens and the mixed polymer is injected into the mold. Within the mold, the polymer cures as a result of the elevated temperature of the mold (e.g., about 200° F. (93.3° C.)). After about 15 seconds, the mold opens and the silicon article can be removed.

The coating shield can also comprise thermoplastic and/or thermoset foams (e.g., open-cell and/or closed cell foams). Manufacture of the foams and foam articles is generally particular to the specific polymer or polymer blend employed. For example, in the case of thermoplastics one exemplary process involves dispersing a blowing agent within the polymer wherein the blowing agent is capable of reacting at elevated temperatures (e.g., greater than about 200° F. (93° C.)) to form gases which foam the polymer melt. For thermosetting polymers one exemplary process involves frothing the thermosetting composition (e.g., polymer, catalyst, cross-linking agent, additional fillers, and the like) using mechanical beating. Once the composition has been frothed, it can be introduced into a mold and subsequently cured.

To be more specific, a silicone foam can comprise a polysiloxane polymer comprising chain substituents such as, hydride, methyl, ethyl, propyl, vinyl, phenyl, and trifluoropropyl groups, and can comprise end groups such as, hydride, hydroxyl, vinyl, vinyl diorganosiloxy, alkoxy, acyloxy, allyl, oxime, aminoxy, isopropenoxy, epoxy, mercapto groups, or other reactive end groups, as well as combinations comprising at least one of the foregoing. The polysiloxane employed has a viscosity about 100 to about 1,000,000 poise at 25° C. and is formed as a result of the reaction between water and hydride groups on the polysiloxane polymer with the consequent liberation of hydrogen gas, which is generally catalyzed by a noble metal, such as platinum.

Suitable silicone foams may also be produced by using several polysiloxane polymers, each having different molecular weights (e.g., bimodal or trimodal molecular weight distributions) as long as the viscosity of the combination lies within the above specified values. It is also possible to have several polysiloxane base polymers with different functional or reactive groups in order to produce the desired foam. It is generally desirable to have about 0.2 moles of Si—H groups per mole of water.

Depending upon the chemistry of the polysiloxane polymers employed, a catalyst (e.g., platinum or a platinum-containing catalyst) can be used to catalyze the blowing and the curing reaction. The catalyst may be deposited onto an inert carrier, such as silica gel, alumina, or carbon black. Unsupported catalysts, such as chloroplatinic acid and forms of chloroplatinic acid (e.g., its hexahydrate form, as alkali metal salt, and its complexes with organic derivatives) can be used. In addition, reaction products of chloroplatinic acid can be employed, such as, alcohols, ethers, and aldehydes. Other effective catalysts include platinum chelates and platinous chloride complexes with phosphines, phosphine oxides, and with olefins such as ethylene, propylene, and styrene. It may also be desirable, depending upon the chemistry of the polysiloxane polymers to use other catalysts such as dibutyl tin dilaurate in lieu of platinum based catalysts.

Various platinum catalyst inhibitors can be used to control the kinetics of the blowing and curing reactions in order to control the porosity and density of the silicone foams. Examples of such inhibitors are polymethylvinylsiloxane cyclic compounds and acetylenic alcohols.

A combination of blowing agents can be employed to obtain foams having desirable characteristics. For example, a physical blowing agent such as a chlorofluorocarbon may be added as a secondary blowing agent to a reactive mixture wherein the primary mode of blowing is the hydrogen released as the result of the reaction between water and hydride substituents on the polysiloxane.

Silicone foams can be tailored to achieve desired properties. For example, a silicone foam coating shield can comprise a density of about 10 to about 30 pounds per cubic foot, lb/ft$^3$ (about 160 to about 481 kg/m$^3$), a 25% compression force deflection (CFD) about 0.5 to about 20 lb/in$^2$ (about 0.3 to about 1.41 kg/m$^2$), an elongation to break of about 50 to about 110%, and a compression set at about 70° F. (21° C.) of less than about 1%.

In one method of producing a silicone foam coating shield, a composition comprising, a polysiloxane polymer, water, a blowing agent, and a catalyst is introduced to an injection molding apparatus utilizing weight based metering hoppers. The composition is then mixed and conveyed within the injection molder's extrusion barrel via an extrusion screw, and a "shot" of material is stored, within the barrel in front of the end of the extruder screw wherein the extrusion barrel is configured with a shut-off nozzle. When a mold comprising a cavity in the form of a desired coating shield is closed, the shot from the extrusion barrel can be injected into the mold to form the foamed coating shield.

Especially suitable blowing agents comprise hydrogen atom-containing components, which can be used alone or as mixtures with each other or with another type of blowing agent such as water or azo compounds. These blowing agents can be selected from a broad range of materials including: hydrocarbons, ethers, esters and partially halogenated hydrocarbons, ethers and esters, and the like. Typical physical blowing agents have a boiling point between about −50° C. (−58° F.) and about 100° C. (212° F.), or more specifically, between about −50° C. (−58° F.) and about 50° C. (122° F.). Among the usable hydrogen-containing blowing agents are the HCFC's (halo chlorofluorocarbons) such as 1,1-dichloro-1-fluoroethane, 1,1-dichloro-2,2,2-trifluoro-ethane, monochlorodifluoromethane, and 1-chloro-1,1-difluoroethane; the HFCs (halo fluorocarbons) such as 1,1,1,3,3,3-hexafluoropropane, 2,2,4,4-tetrafluorobutane, 1,1,1,3,3,3-hexafluoro-2-methylpropane, 1,1,1,3,3-pentafluoropropane, 1,1,1,2,2-pentafluoropropane, 1,1,1,2,3-pentafluoropropane, 1,1,2,3,3-pentafluoropropane, 1,1,2,2,3-pentafluoropropane, 1,1,1,3,3,4-hexafluorobutane, 1,1,1,3,3-pentafluorobutane, 1,1,1,4,4,4-hexafluorobutane, 1,1,1,4,4-pentafluorobutane, 1,1,2,2,3,3-hexafluoropropane, 1,1,1,2,3,3-hexafluoropropane, 1,1-difluoroethane, 1,1,1,2-tetrafluoroethane, and pentafluoroethane; the HFE's (halo fluoroethers) such as methyl-1,1,1-trifluoroethylether and difluoromethyl-1,1,1-trifluoroethylether; and the hydrocarbons such as n-pentane, isopentane, and cyclopentane.

When used, the blowing agents (including water) generally comprise about 1 to about 20 weight percent (wt %), or more specifically, about 2 to about 15 wt %, and even more specifically, about 3 to about 10 wt % of the silicone composition. When a blowing agent has a boiling point at or below ambient temperature, it is maintained under pressure until mixed with the other components.

As previously discussed, the specific polymer composition employed for the coating shields is selected to provide malleability, flexibility, and resiliency. However, the specific polymer composition employed will also affect the coating shield's properties (e.g., masking properties, ease of assembly, and/or retention of the coating shields after assembly), and therefore, will be specifically chosen for each application. For example, highly compressible polymers, such as foamed silicones exhibiting about 25% compression force deflection (CFD) about 0.5 to about 20 lb/in$^2$ (about 0.035 to about 1.41 kg/cm$^2$), can provide high flexibility, conformability, resiliency, and retention within an article (e.g., static friction), which can be well suited for masking applications, wherein the coating shield is inserted into a cavity. In another example, compression resistant polymers, such as non-foamed silicones, can provide greater resiliency, greater retention when assembled onto an article (e.g., a protrusion) and greater resistance to distention than foamed polymers and therefore, can be well suited for applications such as the coating shield 40, wherein the bolts 36 and connectors 32 are inserted into the coating shield 40 and the non-foamed silicone provides an improved grip on the bolts 36 and connectors 32 to maintain the position of the coating shield 40 during coating processes.

Further, depending on the materials employed, the sizing of the coating shield with respect to the article can be tailored per application to attain specific properties such as: fit, retention, masking ability, and so forth. For example, for a coating shield that is assembled within the cavity (e.g., such as coating shield 16, which is assembled within the windings 14, rotor 12, and internal surfaces of the cylinder 4), the coating shield can comprise a compressible material that is sized about equal to or greater than the size of the cavity (e.g., the coating shield comprises about 2% greater volume than the cavity). Sizing the coating shield equal to or greater than the cavity will cause the coating shield to compress once inserted into the cavity, which will exert forces on the cavity and cause the coating shield to conform to the cavity. This is advantageous if the cavity comprises a complex geometry and/or features. Further, as the coating shield's size increases even greater (e.g., more than a 2% larger volume than the cavity), the force exerted by the coating shield on the cavity will further increase, resulting in greater conformity of the coating shield to the cavity, an increase in the assembly and/or disassembly forces, and an increase in the coating shield's ability to mask (e.g., cover) the area desired.

In another example, a coating shield can be configured to fit within a cavity, wherein the coating shield comprises a compression resistant polymer and is sized about equal to or greater than the size of a cavity in which it is to be inserted. In this example, the coating shield will require higher assembly and disassembly forces as the material is compression resistant and the size of the coating shield is about equal to or greater than the cavity. Therefore, to reduce the assembly and disassembly forces the coating shield can be sized slightly less than the cavity (e.g., the coating shield can comprise equal to or greater than about 0.002 inches (0.051 mm) clearance).

For coating shields that are assembled over an article (e.g., similar to the coating shield 40 that is assembled onto the bolts 36), the coating shield can be under sized to provide greater retention forces (i.e., "retention" and "retention forces" are the ability of the coating shield to resist disassembly from the article being masked). The amount the coating shield is undersized will be affected by the properties of the material employed. For example, the bolt pockets 42 on the coating shield 40 can be sized to comprise an internal diameter that is less than the outer diameter of the bolts 36 so that the coating shield 40 is temporarily secured thereto during the coating process. If a compressive material is employed for the coating shield 40, the internal diameter of the bolt pockets 42 can be sized equal to or less than about 85% of the bolts' 36 outer diameter to generate a comparable retention force as that exhibited by a coating shield 40 comprising a compression resistant material having bolt pockets 42 sized equal to about 95% of the bolts' 36 outer diameter.

The coating shields can comprise a smooth and/or textured surface. Smooth surfaces can be employed in applications wherein a surface texture could compromise the masking ability (e.g., sealing ability) of the coating shield. Textured surfaces can be employed in applications wherein a reduction in the surface friction of the coating shield is desirable to reduce assembly and disassembly forces. For example, the internal surfaces of a mold used to form the coating shield can comprise an EDM (electrical discharge machining) surface finish that is imparted into the coating shields formed therein. To be more specific, for textured surfaces, a surface finish that has an average surface roughness (Ra) of greater than or equal to about 20 microinches (about 0.5 micrometers), or more specifically greater than or equal to about 40 microinches (about 1.0 micrometers), or even more specifically greater than or equal to about 60 microinches (about 1.5 micrometers) can be employed. For smooth surface finishes, a surface roughness (Ra) of less than or equal to about 20 microinches, $\mu$in (about 0.5 micrometers, $\mu$m), or more specifically, less than or equal to about 10 $\mu$in (about 0.25 $\mu$m), or even more specifically, less than or equal to about 5.0 $\mu$in (about 0.127 $\mu$m) can be employed.

The handle 18 can comprise any shape that assists in the assembly and disassembly of a coating shield. The material employed for the handle 18 can be any material that can be attached to a coating shield 16, withstand the temperatures and/or chemicals of the curing process, and is reusable at least once. In addition, it is desirable that the polymer employed for the coating shield 16 adheres to the handle 18 during manufacture (e.g., insert LIM molding), however not required. Suitable materials for the handle 18 can comprise polymers (e.g., silicones, polyetherimide, and/or polysulfone), wood, metals, and so forth.

The elastomeric coating shields disclosed herein provide many benefits over other masking processes. First coating shields can conform to complex geometries wherein alternative masking materials, such as tapes, are not capable of doing so. Second, coating shields comprise non-electrically conductive materials that do not attract coatings during electrostatic coating processes. As a result, coatings do not span the interface of the coating shield and the article, which reduces and/or eliminates cracking, peeling, and/or delamination of the coating at the interface when the coating shield is removed. Third, the properties of the elastomeric materials employed for coating shields can be tailored for each application. Fourth, coating shields do not employ adhesives that can leave residual films on the article being masked (i.e., are adhesive free). Finally, coating shields allow manufacturers to reduce the masking costs that are associated with more laborious and time intensive masking methods as well as to reduce the amount of coating used, which results in increased efficiency and greater profitability.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A coating process, comprising:
   assembling a non-electrically conductive coating shield into a channel of a component of a generator;
   electrostatically powder coating the component to form a coated component, wherein during the electrostatically coating, the coating lacks electrostatic attraction to the coating shield, and wherein the coating shield inhibits the coating from entering the channel; and,
   removing the coating shield from the coated component.

2. The process of claim 1, wherein the coating shield comprises a polymer having a Shore A durometer that is less than or equal to about 85.

3. The process of claim 2, wherein the Shore A durometer is less than or equal to about 65.

4. The process of claim 2, wherein the polymer comprises silicone.

5. The process of claim 2, wherein the polymer is foamed.

6. The process of claim 1, wherein the coating shield further comprises a textured surface.

7. The process of claim 1, wherein the coating shield is adhesive free.

8. The process of claim 1, wherein the coating shield is retained within the channel via friction.

9. The process of claim 1, wherein the component is selected from a group consisting of a winding, a rotor, a connection, and combinations comprising at least one of the foregoing.

10. The process of claim 1, wherein assembling the coating shield into the channel forms an interface between the article and the coating shield; and, wherein, when the coating shield is removed from the coated component, the coating disposed at the interface is free of chips, cracks, and delaminations when viewed with an unaided eye at a distance of about 24 inches.

11. The process of claim 1, wherein the coating shield has a noticeable color.

12. The process of claim 1, wherein the coating shield is reusable.

13. The process of claim 1, wherein the assembling the coating shield into the channel, comprises assembling the non-electrically conductive coating shield into the channel without the use of an adhesive.

14. The process of claim 1, wherein the coating shield comprises a polymer that is capable of withstanding the curing operations of about eight hours, at elevated temperatures of about 400° F.

15. The process of claim 1, wherein the coating shield has a compression set resistance of less than 25% as measured at 100° C. under 25% compression for 70 hours.

16. A coating process, comprising:
    assembling a non-electrically conductive coating shield onto a protrusion extending from a component of a generator;
    electrostatically powder coating the component to form a coated component, wherein during the electrostatically coating, the coating lacks electrostatic attraction to the coating shield, and wherein the coating shield inhibits the coating from adhering to the protrusion; and,
    removing the coating shield from the coated component.

17. The process of claim 16, wherein the non-conductive coating shield comprises silicone.

18. The process of claim 16, wherein the component is selected from the group consisting of a winding, a rotor, a bolt, a connection, as well as combinations comprising at least one of the foregoing.

19. A coating process, comprising:
    assembling a non-electrically conductive coating shield onto a protrusion extending from an article;
    electrostatically coating the article to form a coated article, wherein during the electrostatically coating, the coating lacks electrostatic attraction to the coating shield, and wherein the coating shield inhibits the coating from adhering to the protrusion; and, removing the coating shield from the coated article; wherein the coating shield further comprises a suction pocket.

* * * * *